Aug. 9, 1938.　　　　　B. A. LEE　　　　2,126,563
BOTTLE FILLING APPARATUS
Filed April 7, 1936　　　2 Sheets-Sheet 1
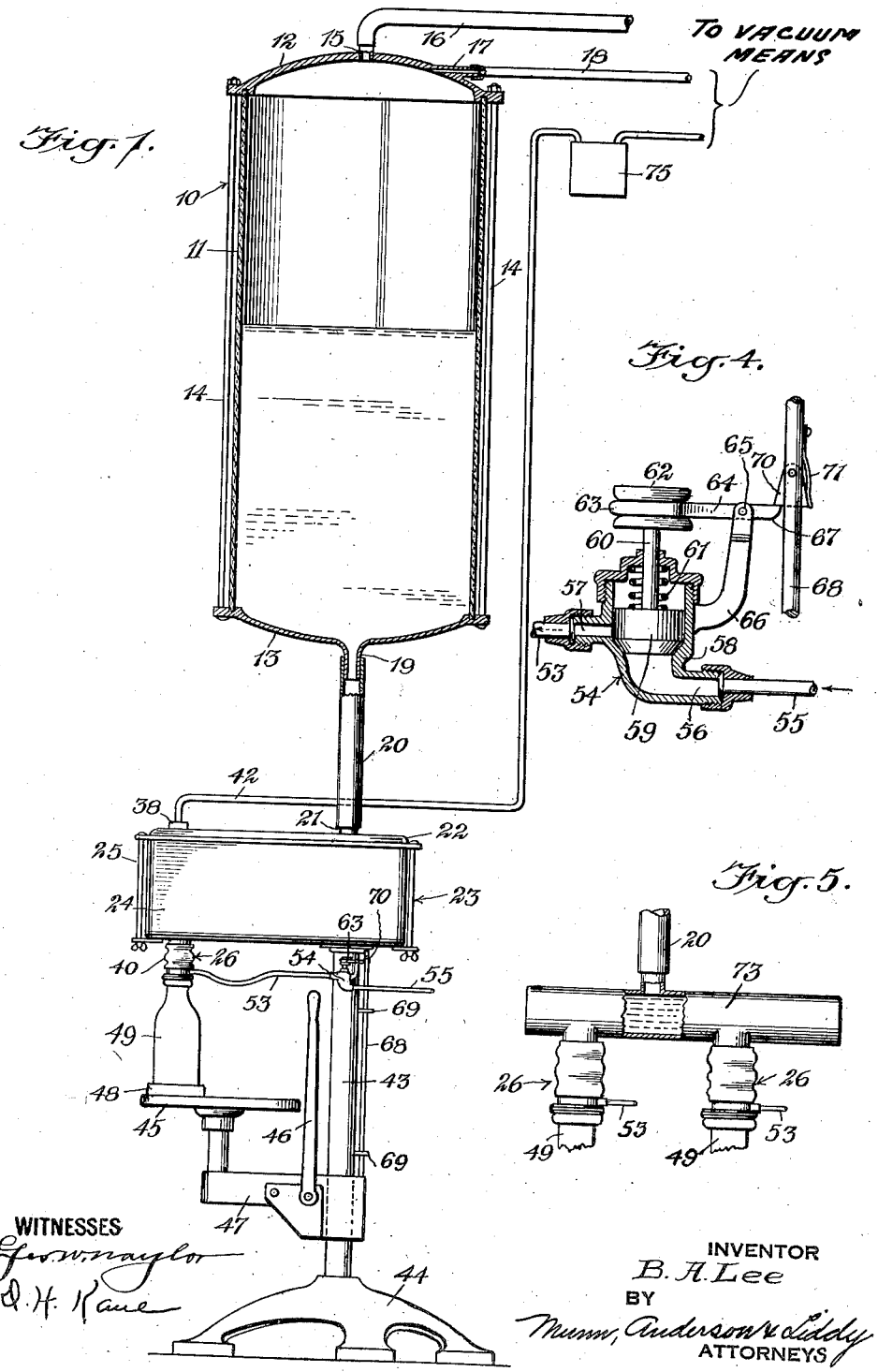

Aug. 9, 1938.   B. A. LEE   2,126,563
BOTTLE FILLING APPARATUS
Filed April 7, 1936   2 Sheets-Sheet 2
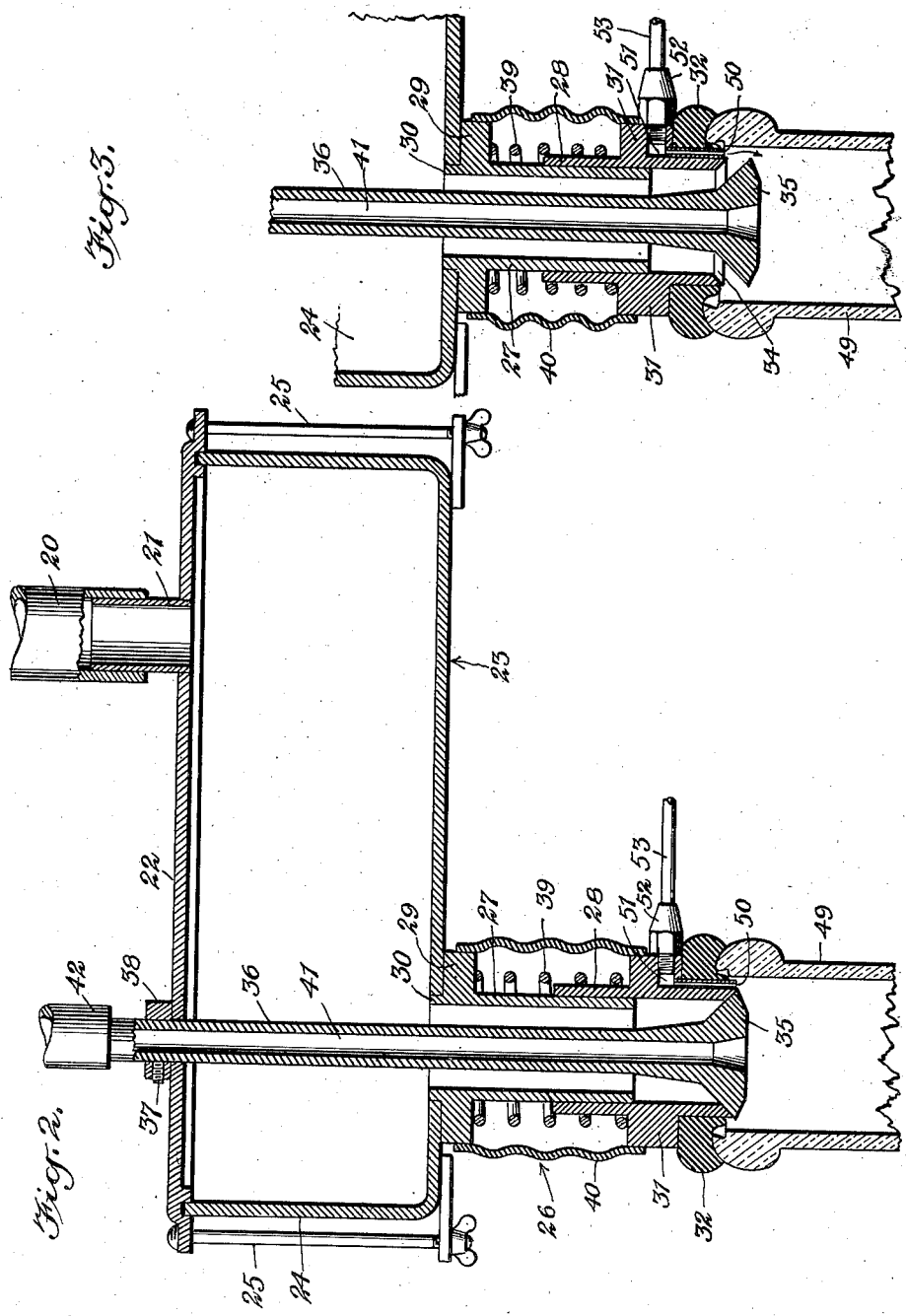
WITNESSES
INVENTOR
B. A. Lee
BY
ATTORNEYS Patented Aug. 9, 1938

2,126,563

UNITED STATES PATENT OFFICE 2,126,563

BOTTLE FILLING APPARATUS

Burgess A. Lee, Lockport, N. Y., assignor to William Rand Kenan, Jr., Lockport, N. Y.

Application April 7, 1936, Serial No. 73,079

6 Claims. (Cl. 226—100)

This invention relates to container filling apparatus and has particular relation to apparatus for filling bottles or other containers with milk.

It is an object of the invention to provide improved apparatus of the above character for bottling raw milk in substantially the same condition as in the udder of a cow. To do this the milk must be kept from any substantial or prolonged contact with the air. Heretofore, milk has been taken from the cow by means of milking machines and has been conducted through sealed tubes to a storage tank without any substantial contact with the air. However, in the apparatus heretofore used, when individual containers or bottles were filled with the milk from the storage tank, the milk came into contact with the air, resulting in certain changes in the condition of the milk. The present invention overcomes these difficulties by providing container filling apparatus which fills individual bottles or containers with milk from the storage tank without exposing the milk to air. The apparatus may, of course, also be used in filling containers or bottles with other fluids, especially where it is desired to prevent the fluid from coming into contact with air.

A further object is to provide an improved apparatus for filling containers and the like which operates in a simple improved manner, first evacuating the container and then introducing the new fluid, all in a single, relatively simple operation.

Another object is to provide in milk bottle filling apparatus mechanism for introducing an inert gas, preferably carbon dioxide, into the top of the bottle immediately after it has been filled, thereby aiding to preserve the milk in its original condition and also helping to break the engagement between the bottle and the filling apparatus.

For a fuller understanding of the invention, reference should be had to the accompanying drawings, in which Figure 1 is an elevation in section of a bottle filling apparatus embodying my invention showing it in association with one form of fluid tank, stand and shiftable bottle table, Figure 2 is an elevation in section showing the nozzle portion of my improved bottle filling apparatus with the valve in closed position and having a milk bottle in sealing engagement therewith, Figure 3 is an elevation in section somewhat similar to Figure 2, but showing the valve in open position so as to permit the milk or other fluid to enter the bottle, Figure 4 is a sectional elevation of the valve for controlling the flow of carbon dioxide or other inert gas into the top of the container after it has been filled, and Figure 5 shows a modification of my invention so as to permit several containers to be filled simultaneously.

In the accompanying drawings the numeral 10 indicates a storage tank for the milk or other fluid with which the containers are to be filled, and is preferably formed of a cylindrical glass member 11 which fits in annular grooves formed in the top and bottom members 12 and 13 respectively preferably formed of metal and held together as by means of the rods 14 extending through peripheral flanges formed on the top and bottom members. The top 12 of the storage tank is provided with a nipple 15 which is connected by means of a tube or hose 16 to a source of supply of the fluid. Where, as in the illustrated embodiment, the apparatus is to be used in filling bottles with milk, the tube 16 is connected with a milking machine and in this way milk will be fed directly from the udder of a cow into the storage tank 10 without coming into substantial or prolonged contact with the atmosphere. The top 12 of the tank is also provided with another nipple 17 connected by means of a tube or hose 18 to suction apparatus which is adjusted so as draw a vacuum in the tank 10 giving a reading of approximately fifteen inches or less on a mercury column.

The bottom 13 of the tank is provided with a spout 19 connected by means of tube or hose 20 to a nipple 21 formed in the top 22 of an auxiliary or smaller tank 23 which may be of any desired construction but is preferably formed of metal having a receptacle portion 24 secured to the top 22 as by means of the rods 25. The tank 23, due to the connecting tube 20, will be evacuated to the same extent as tank 10.

The bottom of the auxiliary or smaller tank 23 has connection with a bottle filling nozzle, indicated generally at 26, which is preferably so constructed as to be expansible and contractible, and has associated therewith means for normally holding it in expanded position and a valve which is in closed position when the nozzle is expanded and in open position when the nozzle is contracted. In this manner, when a bottle is placed against the lower end of the nozzle and pressed upwardly, the valve will be opened to permit fluid to flow into the bottle.

To accomplish the desired results in maintaining the fluid free from any substantial contact with the air, the nozzle should be substantially air-tight, and I have found that a satisfactorily air-tight construction is obtained by providing a pair of telescoping cylindrical sections 27 and 28, the section 27 being provided with a laterally extending flange 29 fitting against the bottom of the tank 23 and with a portion 30 extending through an opening provided in the bottom of the tank, the section 27 being suitably secured to the tank as by being welded, brazed or soldered thereto. The section 28 fits over the section 27, having sliding engagement therewith, and is provided with an annular rib 31 adjacent its lower end, which aids in holding in position an annular abutment member 32 preferably formed of a yielding resilient material such as rubber and shaped on its lower surface so as to receive and form sealing engagement with the top of the container which is to be filled. When used for filling bottles, as shown in the accompanying drawings, the lower surface of the abutment member 32 should be provided with an annular groove or cut-out portion shaped so as to fit snugly over the lip portion usually provided at the top of a milk bottle.

The lower end of the telescoping member 28 is provided with an annular valve seat 34 which is angularly disposed, slanting inwardly and upwardly, so as to receive and form sealing engagement with the angularly disposed sides of the valve 35 which is held in fixed position by means of valve stem 36 extending upwardly through the center of the nozzle through tank 23. The valve stem 36 passes through an opening formed in the top 22 of the tank 23 and is held in position by means of a set screw 37 in collar 38 brazed, welded or soldered to the top of the tank. Of course, the connection between valve stem 36, collar 38 and the top of the tank should be such as to prevent any leakage of air into the tank 23 and, if necessary, packing may be employed to accomplish this purpose.

The telescopic sections 27 and 28 are normally held in expanded position, as shown in Figure 2 of the drawings, so that the valve 35 is seated against its seat 34 closing the end of the nozzle, and suitable means, such as coil spring 39 extending around the two sections 27 and 28 between the annular ribs 29 and 31, is provided to thus hold the nozzle in expanded or extended position. To prevent any leakage of air into the system, I preferably provide an air-tight, flexible casing made of rubber or other suitable material around the outside of the nozzle and extending between and preferably cemented or otherwise secured to the annular ribs 29 and 31. It will thus be seen that by placing the top of a bottle against the lower surface of abutment member 32, sealing engagement between the bottle and nozzle may be secured and that by pressing the bottle upwardly, the nozzle is compressed or contracted, thereby pushing valve seat 34 away from the valve 35 and permitting fluid to enter the bottle.

However, if the fluid were permitted to enter the bottle with the bottle in the condition which it is in when placed against the abutment member, the fluid would naturally come into contact with the air in the bottle. In order to prevent this, I provide suitable means for first evacuating the bottle, at least to the same extent that the tanks 10 and 23 have been evacuated. This I preferably accomplish by providing a duct 41 extending through the valve 35 and valve stem 36 and communicating with the tube or flexible hose 42 connected to the top of the valve stem above the tank 23, the hose 42 being connected to suitable suction apparatus, preferably the same suction apparatus to which the tube or hose 18 of tank 10 is connected. Due to this arrangement, it will be seen that when the bottle or other container is placed into contact with the abutment member 32, forming sealing engagement therewith, the bottle will be first evacuated by the suction apparatus, and then, when the bottle is pressed upwardly opening the valve, fluid will enter the evacuated bottle or container through the open end of the nozzle and in this way will not have any substantial contact with air. The suction apparatus is adjusted so as to evacuate the bottle to the same extent that the tanks 10 and 23 were evacuated, that is, so as to give a reading of approximately fifteen inches on a mercury column.

The apparatus is suitably supported, as on a column 43 on stand 44, and mounted on the same column in a position beneath the nozzle 26 is a shiftable bottle supporting table 45 which may be of any desired construction, such as the one illustrated in the accompanying drawings, which is a conventional type in common use. The table 45 is shiftable in a vertical plane towards and away from the nozzle 26, and the shifting is controlled by suitable means such as a lever 46 pivoted to the bracket 47 which has sliding engagement with the column 43 and supports the table 45. The lever 46 preferably is connected to suitable gear and rack apparatus so that pivoting of the lever in one direction causes the bracket 47 and table 45 to shift upwardly to the position shown in Figure 1, while pivoting of the lever 46 in the opposite direction causes the bracket 47 and table 45 to shift downwardly, permitting the bottle to be removed from the lower end of nozzle 26. The path of movement of the table 45 is such that in its lowermost position, a bottle may be placed on or removed from the table without interfering with nozzle 26. Pivoting of lever 46 to raise the table upwardly, however, causes the bottle first to engage and form sealing engagement with abutment member 32 and finally, when the table reaches its uppermost position, causes the bottle to compress the nozzle to the position shown in Fig. 1 and Fig. 3 with the valve opened, so that fluid may enter the bottle. The table may be provided with a circular upright flange 48 on its upper surface in the same vertical plane as the nozzle 26, so as to mark off the place where the bottle, indicated at 49, is to be positioned.

It will be appreciated that due to the connection of the suction apparatus through duct 41 with the inside of the bottle or container 49, atmospheric pressure will cause the bottle 49 to adhere to the abutment member 32 of the nozzle and that after the bottle is filled certain difficulty or inconvenience may be experienced in removing the bottle from the nozzle. To avoid this, and also to aid in preserving the proper condition of the milk, I provide suitable means for introducing an inert gas, preferably carbon dioxide, into the bottle after it has been filled with milk. I prefer to use carbon dioxide because a certain quantity of this gas is present in the milk inside the cow's udder and has a beneficial effect on the milk.

The apparatus for introducing the gas preferably consists of a small tube 50 extending between the abutment member 32 and the outer surface of the telescoping cylindrical member 28 and communicating at its lower end with the inside of the bottle or container and at its upper end with a chamber 51 formed in the annular rib 31. The chamber 51 has threaded therein a suitable nipple or pipe connector 52 connected by tube 53 to a control valve 54, which in turn is connected by tube 55 to a suitable source of supply of the carbon dioxide or other inert gas. The valve preferably operates automatically so that, when the bottle has been filled and the table begins its downward movement, the gas will be permitted to flow into the container through the tube 50. Thus the valve is provided with an inlet duct and an outlet duct 56 and 57 respectively and a valve seat 58 to receive valve body 59 which is mounted on the end of a valve stem 60 extending upwardly through the top of the valve. A coil spring 61 normally keeps the valve in closed position with the valve body seated against its seat. The upper end of the valve stem is connected to a member 62 provided with an annular groove receiving the bracket 63 formed on the end of a lever 64 pivoted at 65 to a bracket 66 secured to the valve casing. The outer end 67 of lever 64 is provided with a straight or flat upper surface and with a curved lower surface.

It will be seen that by depressing the end 67 of lever 64 the valve will be opened and that, when the end 67 is released, the spring 61 will cause the valve to again automatically close. Suitable mechanism is provided so as to cause the valve to operate in response to the lowering of table 45, and this may consist of a rod 68 secured to and shiftable with the bracket 47 and which may pass through and have sliding engagement with the supports 69 secured to the column 43. Pivoted to the rod 68 is the operating plate 70 having a flat horizontal lower surface and angularly disposed sides diverging downwardly. When the table and bracket 47 are in elevated position, the plate 70 is positioned above and in engagement with the upper surface of the end 67 of the lever 64, as shown in Figures 1 and 4. A spring 71 secured to rod 68 is preferably provided so as to hold the plate 70 depending downwardly in the position shown in Figure 4. It will be seen that when the lever 46 is pivoted to lower the bracket 47 and table 45, the plate 70 presses downwardly upon the end 67 of the lever 64 opening the valve and permitting gas to enter the bottle 49. When the rod 68 shifts downwardly a sufficient distance, the lever 64 will move out of engagement with the plate 70 and, due to the action of spring 61, will move upwardly and the valve will close, shutting off further flow of the gas. When the bracket 47, table 45 and rod 68 are shifted upwardly, due to the curved undersurface of the end of lever 64 and the formation of the side of plate 70 and the spring 71, the plate 70 will be permitted to pivot around its axis and slide past the end of the lever until the lower end of the plate is in a plane above the lever 64, at which point the spring 71 will cause the plate to shift back to the position shown in Figure 4.

My apparatus may be arranged so as to fill a plurality of bottles or other containers at the same time by means of apparatus shown in Figure 5, in which the tube 20 leading from the lower end of storage tank 10 has suitable connection with a horizontally extending pipe 73. At various points along the pipe 73 are provided the nozzles 26 similar in construction to those previously described. The table 45 is then arranged so as to hold a plurality of bottles which may be raised upwardly simultaneously into sliding engagement with the lower ends of the nozzles 26.

In operation, the storage tank 10 and auxiliary tank 23 are first evacuated, as previously described, through tube 18, and then the milk or other fluid to be fed into the containers is introduced into the tanks through pipe 16. In the case of milk, it is preferably fed directly from milking machines without any contact with the air. Since the pressure in the tanks 10 and 23 is substantially the same, the milk will flow downwardly, due to the action of gravity, into the tank 23. The tank 10 is filled to a point preferably substantially below the nipple 17 at the top thereof, so that the atmospheric pressure inside the tank may be kept at the same low level and so that no milk enters the suction tube 18. The milk bottle or other container 49 is then placed in the proper position on shiftatble table 45 beneath the nozzle 26 and lever 46 is pivoted so that the top of the bottle forms sealing engagement with the abutment member 32, as indicated in Figure 2 of the drawings, in which position the bottle is evacuated through duct 41, tube 42 and the suction apparatus. As the lever 46 is further pivoted, the top of the bottle presses the lower end of the nozzle upwardly, opening the valve to the position shown in Figure 3, when the milk or other fluid flows downwardly into the bottle. When the bottle is filled, it will be appreciated that some of the milk will be drawn upwardly through tube 42 but not above the level of the milk in tank 10. For this reason the tube 42 is extended upwardly above the level of the milk in the tank 10. This is desirable as a certain amount of foam is formed in the top of the bottle and the suction apparatus will draw it off. When the bottle has thus been filled, the bottle is lowered and immediately, as the table starts to shift downwardly due to the interengagement between plate 70 and lever 64, the valve 54 is opened, permitting carbon dioxide to flow through tube 50 into the top of the milk bottle, breaking the suctional engagement between the nozzle and bottle and also introducing a certain amount of the carbon dioxide into the milk, with its resultant beneficial effect. Further pivoting of the lever shifts the top of the milk bottle from engagement with the abutment member 32 and the bottle may be removed from the table and a new bottle placed thereon, and the action just described repeated.

To prevent any of the milk which is sucked into the suction line 42 from entering the suction apparatus, I preferably provide a trap 75 at substantially the same level as the top of the milk in tank 10 and this trap may be emptied from time to time.

It will be seen by the embodiment of my invention herein illustrated and described that I have provided improved container filling apparatus which operates in a simple, efficient manner, which may be used for filling bottles or other containers with milk, preventing the milk from coming into any substantial contact with the air, and which is provided with automatic mechanism for introducing carbon dioxide or other inert gas into the container after it has been filled.

It is to be understood that many modifications may be made in the herein illustrated and described embodiment of my invention without departing from the invention as defined in the accompanying claims. Thus the bottle filling apparatus may be used in association with different types of stands, bottle tables and storage tanks and may be used in filling containers with fluids other than milk if desired.

I claim:

1. Apparatus for filling a container with a fluid comprising a telescoping nozzle connected to a source of supply of the fluid and formed with a spring for normally holding it in extended position and with an abutment portion at its lower end for forming sealing engagement with the container to be filled, a valve for controlling the flow of fluid from said nozzle and formed so as to be closed when the nozzle is in extended position and open when the nozzle is in contracted position so that when a container is placed against the abutment portion and raised upwardly the valve is opened, means extending below the valve and having connection with suction apparatus for evacuating the container prior to introducing the fluid therein, and means associated with said nozzle and having an automatically operating valve for introducing inert gas into the container after it is filled and is being lowered from said abutment portion.

2. Apparatus for filling a container with a fluid comprising a nozzle connected to a source of supply of the fluid and having an abutment portion formed at its lower end for forming sealing engagement with a container to be filled, means for raising and lowering the container into and out of engagement with said abutment portion, and means operative in response to the lowering of the last named means for introducing an inert gas into the container.

3. Apparatus for filling a container with a fluid comprising a telescoping nozzle connected to a source of supply of the fluid and formed with a spring for normally holding it in extended position and with an abutment portion at its lower end for forming sealing engagement with the container to be filled, a valve for controlling the flow of fluid through said nozzle and formed so as to be closed when the nozzle is in extended position and open when the nozzle is in contracted position so that when a container is placed against the abutment portion and raised upwardly the valve is opened, a vertically shiftable support for shifting the container into and out of engagement with said abutment portion, and means operating in response to the lowering of said support for introducing an inert gas into the container.

4. Apparatus for filling a container with a fluid comprising a telescoping nozzle connected to a source of supply of the fluid and formed with a spring for normally holding it in extended position and with an abutment portion at its lower end for forming sealing engagement with the container to be filled, a valve for controlling the flow of fluid through said nozzle and formed so as to be closed when the nozzle is in extended position and open when the nozzle is in contracted position so that when a container is placed against the abutment portion and raised upwardly the valve is opened, a vertically shiftable support for shifting the container into and out of engagement with said abutment portion, means extending below the valve and having connection with suction apparatus for evacuating the container prior to introducing the fluid therein, and means operating in response to the lowering of the support for introducing an inert gas into the container after it has been filled.

5. Apparatus for filling a container with a fluid comprising a tank for the fluid having connection with suction apparatus and a telescoping nozzle having connection with said tank and formed with an abutment portion at its lower end to receive and form sealing engagement with a container, said nozzle having a valve for controlling the flow of fluid therethrough and arranged so as to be closed when the nozzle is in extended position and open when in contracted position so that when a container is placed against the abutment portion and raised upwardly the valve is opened and said nozzle being provided with a duct extending below said valve and having connection with the suction apparatus and with means having an automatically operating valve for introducing inert gas into the container after it is filled and is being lowered from said abutment portion.

6. Apparatus for filling a container with a fluid comprising a nozzle having connection with a source of supply of the fluid with which the container is to be filled and comprising telescoping sections provided with means for normally holding the nozzle in extended position and having a casing formed of resilient air-tight material surrounding the telescoping sections, a valve for controlling the flow of fluid through said nozzle and formed so as to be closed when the nozzle is in extended position and open when in contracted position so that when a container is placed against the end of the nozzle and raised upwardly the valve is opened, means for raising and lowering the container into and out of engagement with the lower end of the nozzle, and means operating in response to the lowering of the last named means for introducing an inert gas into the container.

BURGESS A. LEE.